(12) United States Patent
Davis et al.

(10) Patent No.: US 11,584,284 B2
(45) Date of Patent: Feb. 21, 2023

(54) COUNTERTOP WITH RETRACTABLE STORAGE ASSEMBLY

(71) Applicant: Gulfstream Aerospace Corporation, Savannah, GA (US)

(72) Inventors: Timothy Allen Davis, Savannah, GA (US); Timothy O'Hara, Savannah, GA (US)

(73) Assignee: Gulfstream Aerospace Corporation

( * ) Notice: Subject to any disclaimer, the term of this patent is extended or adjusted under 35 U.S.C. 154(b) by 106 days.

(21) Appl. No.: 16/949,040

(22) Filed: Oct. 9, 2020

(65) Prior Publication Data
US 2021/0114500 A1 Apr. 22, 2021

Related U.S. Application Data

(60) Provisional application No. 62/916,555, filed on Oct. 17, 2019.

(51) Int. Cl.
*B60N 3/10* (2006.01)
*B63B 29/22* (2006.01)
*B60N 3/00* (2006.01)
*B64D 11/04* (2006.01)

(52) U.S. Cl.
CPC ............. *B60N 3/102* (2013.01); *B60N 3/001* (2013.01); *B63B 29/22* (2013.01); *B64D 11/04* (2013.01)

(58) Field of Classification Search
CPC ........ B60N 3/102; B60N 3/001; B63B 29/22; A47B 81/00
USPC ............ 108/20, 26, 25; 312/130, 23, 25, 29, 312/139.1, 140.1, 270.1; 211/41.11
See application file for complete search history.

(56) References Cited

U.S. PATENT DOCUMENTS

| 322,279 | A | * | 7/1885 | Gerald | A47B 21/02 312/25 |
| 333,225 | A | * | 12/1885 | Horrocks | A47B 21/02 312/23 |
| 335,576 | A | * | 2/1886 | Gerald | A47B 21/02 312/25 |
| 363,460 | A | * | 5/1887 | Harter et al. | A47B 21/02 312/25 |
| 408,385 | A | * | 8/1889 | Kiefer | A47B 21/02 312/25 |

(Continued)

FOREIGN PATENT DOCUMENTS

FR 2551333 A3 * 3/1985

*Primary Examiner* — Jose V Chen
(74) *Attorney, Agent, or Firm* — LKGlobal | Lorenz & Kopf, LLP

(57) ABSTRACT

Countertop storage assembly are provided. In one example, a countertop storage assembly includes a countertop having a countertop area outer surface, a countertop area inner surface, and an opening formed therethrough. A retractable storage assembly includes a lid that is disposed in the opening when in a closed position and that moves between the closed position and an open, retracted position. During movement from the closed position to the open, retracted position, the lid moves downward and away from the opening to below the countertop off-set from the opening. A storage area includes a base that is in a retracted position situated below the countertop when the lid is in the closed position. The base moves from the retracted position to a deployed position where the base is disposed in the opening when the lid is in the open, retracted position.

18 Claims, 10 Drawing Sheets

(56) References Cited

U.S. PATENT DOCUMENTS

| | | | | |
|---|---|---|---|---|
| 1,480,259 | A * | 1/1924 | Greiner | A47B 21/02 |
| | | | | 312/23 |
| 2,033,642 | A * | 3/1936 | Moore | A47B 69/00 |
| | | | | 109/47 |
| 2,527,407 | A * | 10/1950 | Dunn | A47B 77/12 |
| | | | | 312/272.5 |
| 2,875,012 | A * | 2/1959 | Riley | A47B 51/00 |
| | | | | 312/312 |
| 3,245,741 | A * | 4/1966 | Bartlett | A47B 17/02 |
| | | | | 312/196 |
| 3,478,193 | A * | 11/1969 | Molitor | A47B 31/02 |
| | | | | 296/22 |
| 4,312,549 | A * | 1/1982 | Ravenelle | D05B 75/02 |
| | | | | 312/26 |
| 6,766,747 | B1 * | 7/2004 | Wolfe | A47B 25/00 |
| | | | | 108/26 |
| 7,922,267 | B2 * | 4/2011 | Gevaert | A47B 21/0073 |
| | | | | 108/50.01 |
| 2011/0146541 | A1 * | 6/2011 | Griepentrog | G06F 1/1632 |
| | | | | 312/25 |
| 2011/0155867 | A1 * | 6/2011 | Griepentrog | A47B 21/0073 |
| | | | | 248/125.2 |
| 2014/0265753 | A1 * | 9/2014 | Soper | A47B 21/06 |
| | | | | 312/22 |
| 2014/0368097 | A1 * | 12/2014 | Yomogita | G02B 27/0149 |
| | | | | 312/23 |
| 2016/0229603 | A1 * | 8/2016 | Amick | B60N 3/102 |
| 2020/0369190 | A1 * | 11/2020 | Baur | B60N 3/102 |

* cited by examiner

US 11,584,284 B2

COUNTERTOP WITH RETRACTABLE STORAGE ASSEMBLY

CROSS-REFERENCE TO RELATED APPLICATIONS

This application is related to and claims all available benefit of U.S. Provisional Patent Application 62/916,555 filed Oct. 17, 2019, the entire contents of which are herein incorporated by reference.

TECHNICAL FIELD

The technical field relates generally to countertop areas including a storage unit, and more particularly, relates to countertop areas, such as, for example, of a galley, credenza, or the like, that includes a retractable storage assembly for vehicles, for example aircraft, boats, automotive vehicles, or the like.

BACKGROUND

Providing a storage unit in a vehicle, such as, for example, an aircraft, a motor vehicle, or the like, to store beverages and beverage accessories, food products and food containers, articles, belongings, and/or other items and to present such items in an accessible manner to passengers or other vehicle occupants is desirable for many vehicle manufacturers. However, open storage areas can be relatively unsightly and aesthetically displeasing.

Accordingly, it is desirable to provide a storage assembly for a vehicle that addresses one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a countertop storage assembly are provided herein.

In a first non-limiting embodiment, the countertop storage assembly includes, but is not limited to, a countertop having a countertop area outer surface that is exposed, a countertop area inner surface that is disposed opposite the countertop area outer surface, and an opening formed therethrough. The countertop storage assembly further includes, but is not limited to, a retractable storage assembly. The retractable storage assembly includes, but is not limited to, a lid that is disposed in the opening when in a closed position and that is operatively coupled to the countertop to move between the closed position and an open, retracted position. During movement from the closed position to the open, retracted position, the lid moves downward and away from the opening to below the countertop off-set from the opening. The retractable storage assembly further includes, but is not limited to, a storage area including a base that is in a retracted position situated below the countertop and the lid when the lid is in the closed position. The base is configured to move from the retracted position to a deployed position where the base is disposed in the opening when the lid is in the open, retracted position.

In a second non-limiting embodiment, the countertop storage assembly includes, but is not limited to, a countertop having a countertop area outer surface that is exposed, a countertop area inner surface that is disposed opposite the countertop area outer surface, and an opening formed therethrough. The countertop storage assembly further includes, but is not limited to, a retractable storage assembly. The retractable storage assembly includes, but is not limited to, a lid that is disposed in the opening when in a closed position and that is operatively coupled to the countertop to move between the closed position and an open, retracted position. During movement from the closed position to the open, retracted position, the lid moves partially rotationally and translationally from a substantially horizontal orientation in the closed position downward and in an outboard direction to a substantially vertical orientation underneath the countertop area inner surface off-set from the opening in the open, retracted position. The retractable storage assembly further includes, but is not limited to, a storage area including a base that is in a retracted position situated directly below the opening when the lid is in the closed position. The base is configured to move vertically from the retracted position to a deployed position where the base is disposed in the opening when the lid is in the open, retracted position.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

The exemplary embodiments taught herein provide a retractable storage assembly that is coupled to a countertop. The countertop may form part of a galley, a credenza, or other furniture item for an interior of a vehicle, for example an aircraft, a motor vehicle, or the like.

The retractable storage assembly includes a storage area (e.g., bar or other storage area) formed of a base that supports a storage rack for storing beverages, beverage accessories, food products, food containers, articles, belongings, and/or other items. When the storage area is in a deployed position, it extends above an upper outer surface of the countertop and is accessible to passengers or other vehicle occupants. When the storage area is in the retracted position, it is situated below the upper outer surface of the countertop and out of view.

The storage assembly further includes a lid that is sized or otherwise fitted into an opening formed through the countertop's upper outer surface to close off the countertop above the storage area when the storage area is retracted. In particular, the lid is a door that fits very closely or tightly with the surrounding surface of the countertop. This creates the appearance of a continuous, uninterrupted upper outer surface that is aesthetically pleasing. As discussed in further detail below, the retractable storage assembly includes a mount that is employed to moveable dispose the lid substantially flush with the surface of the countertop that permits the coupling mechanism that moves the retractable storage assembly to be situated below the surface of the countertop when the storage area is deployed and to be completely concealed by the lid when the storage area is retracted.

Figure 1:
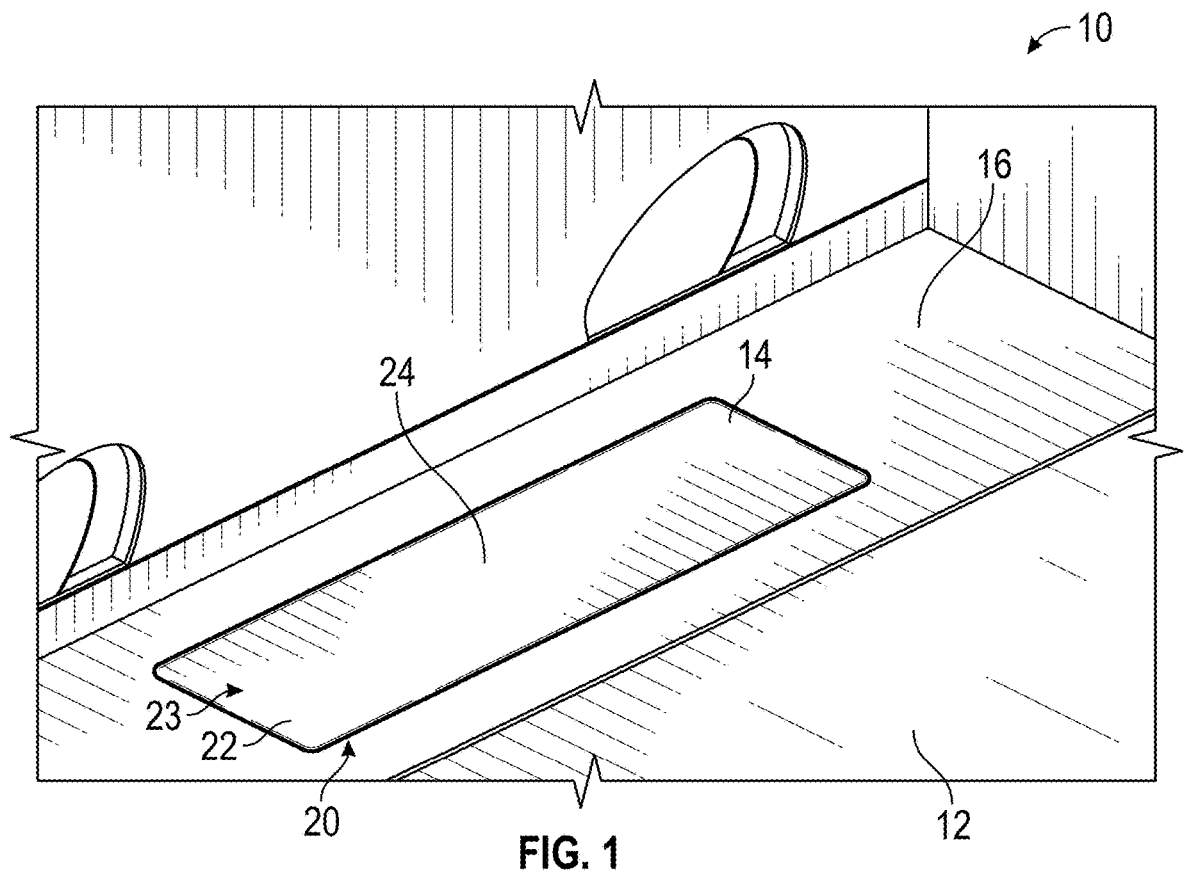
FIG. 1 illustrates a perspective view of a countertop area and a retractable storage assembly including a lid in a closed position in accordance with an exemplary embodiment.
Figure 2:
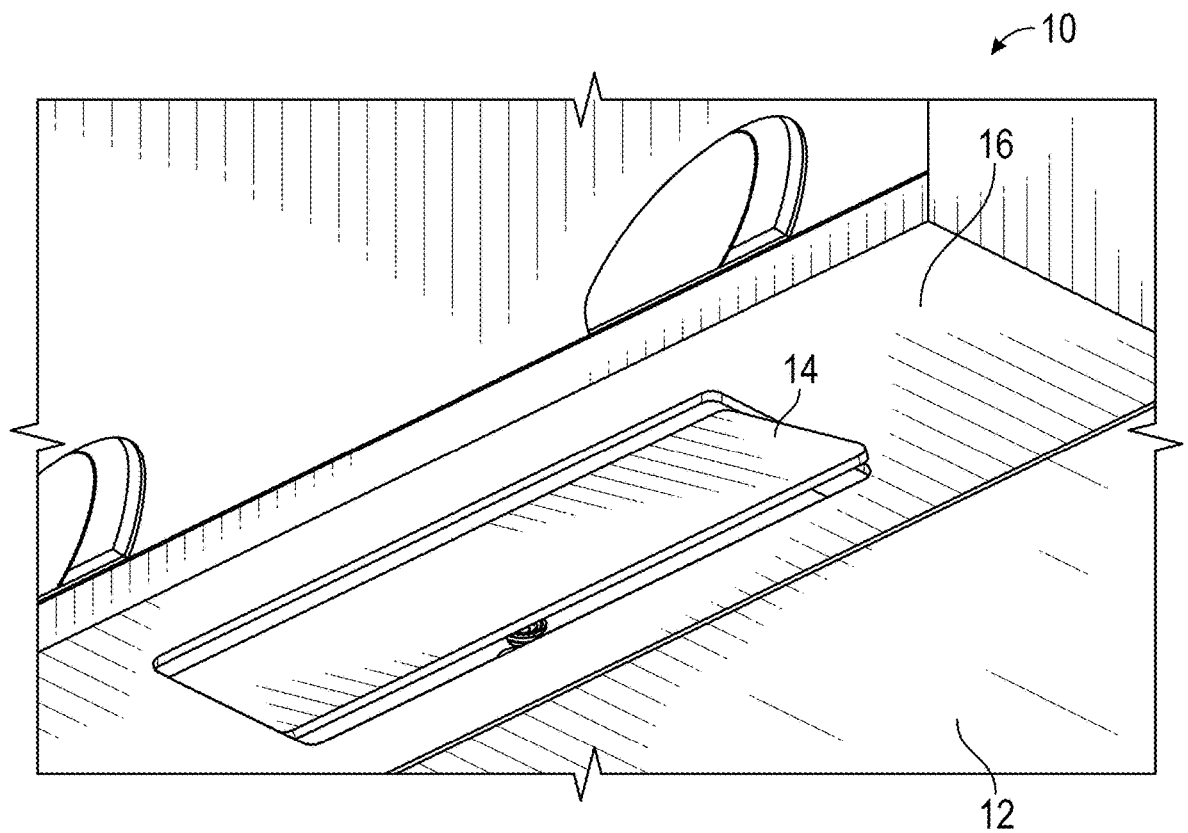
FIG. 2 illustrates a perspective view of a countertop area and a retractable storage assembly including a lid in a partially open, retracted position in accordance with an exemplary embodiment.
Figure 3:
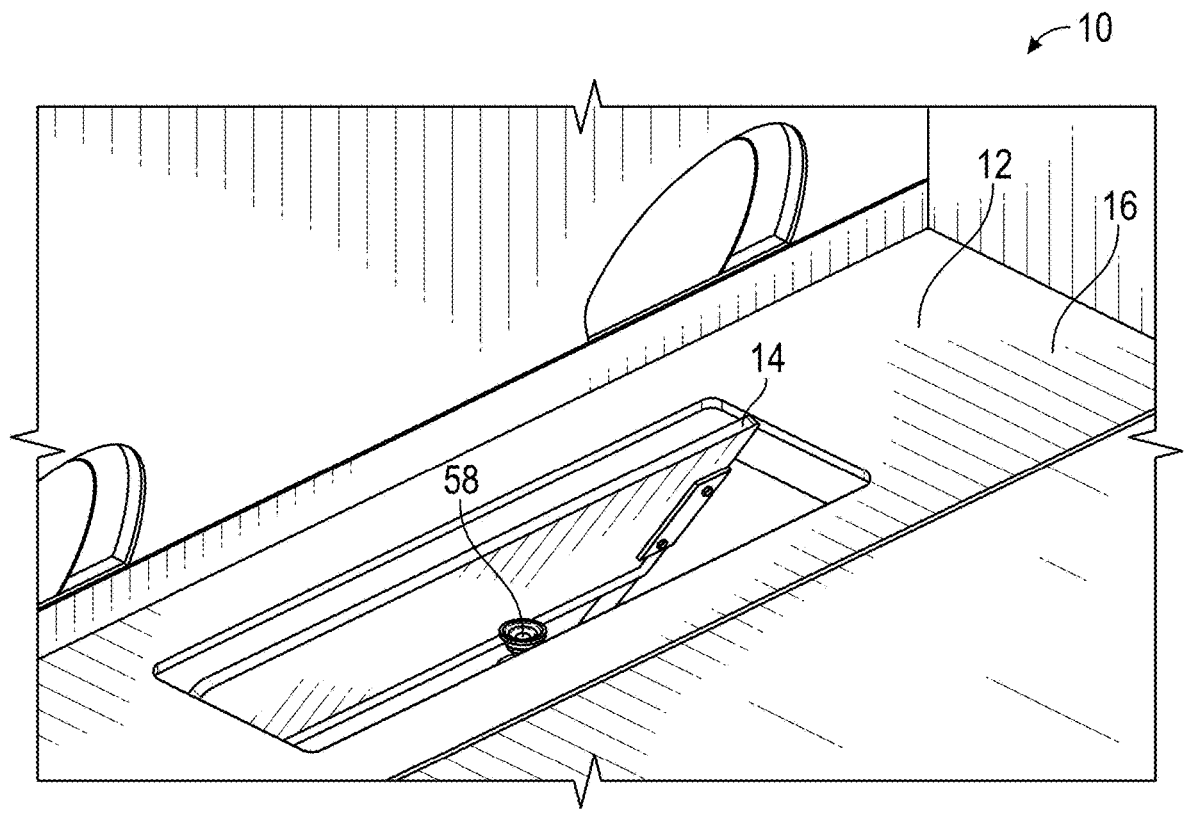
FIG. 3 illustrates a perspective view of a countertop area and a retractable storage assembly including a lid in a further advanced open, retracted position in accordance with an exemplary embodiment.
Figure 8:
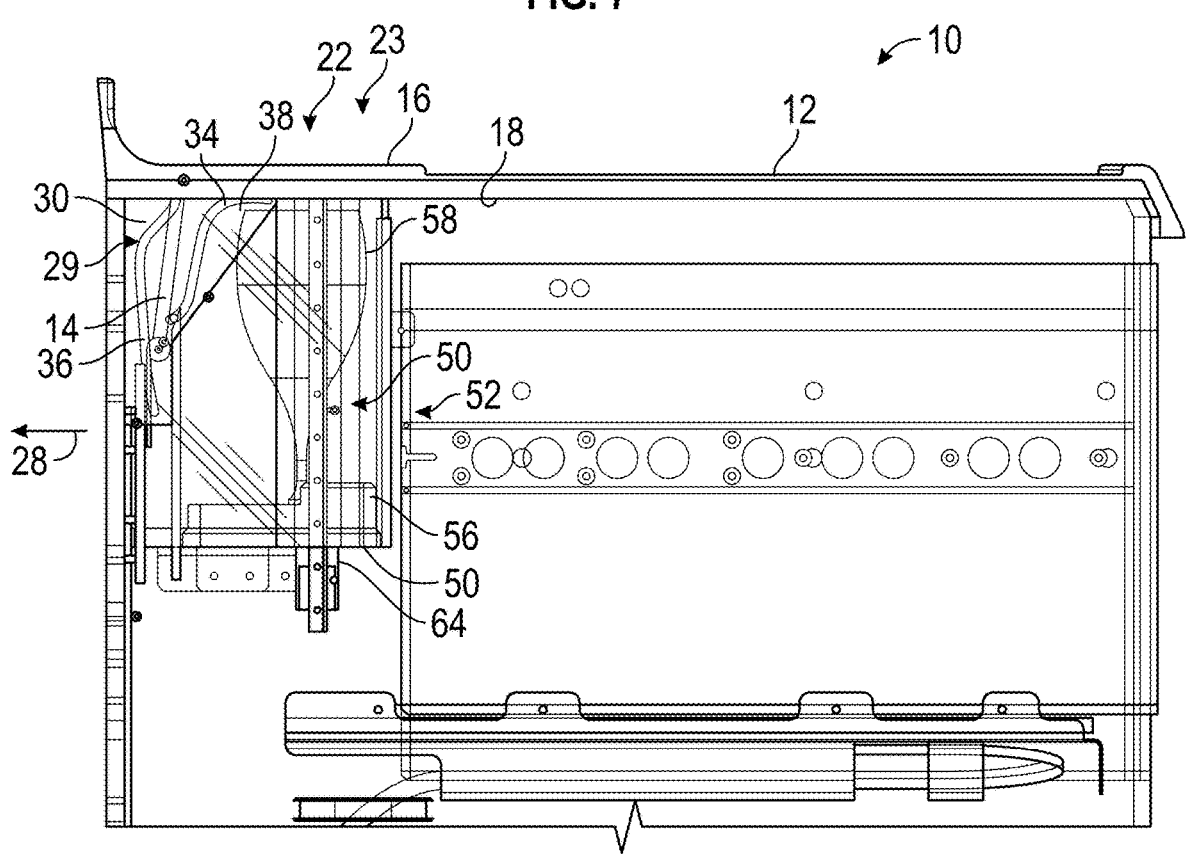
FIG. 8 illustrates a side view of a galley with a countertop area and a retractable storage assembly including a lid in a closed position, and a base that supports a storage rack in a stowed position in accordance with an exemplary embodiment.
Figure 9:
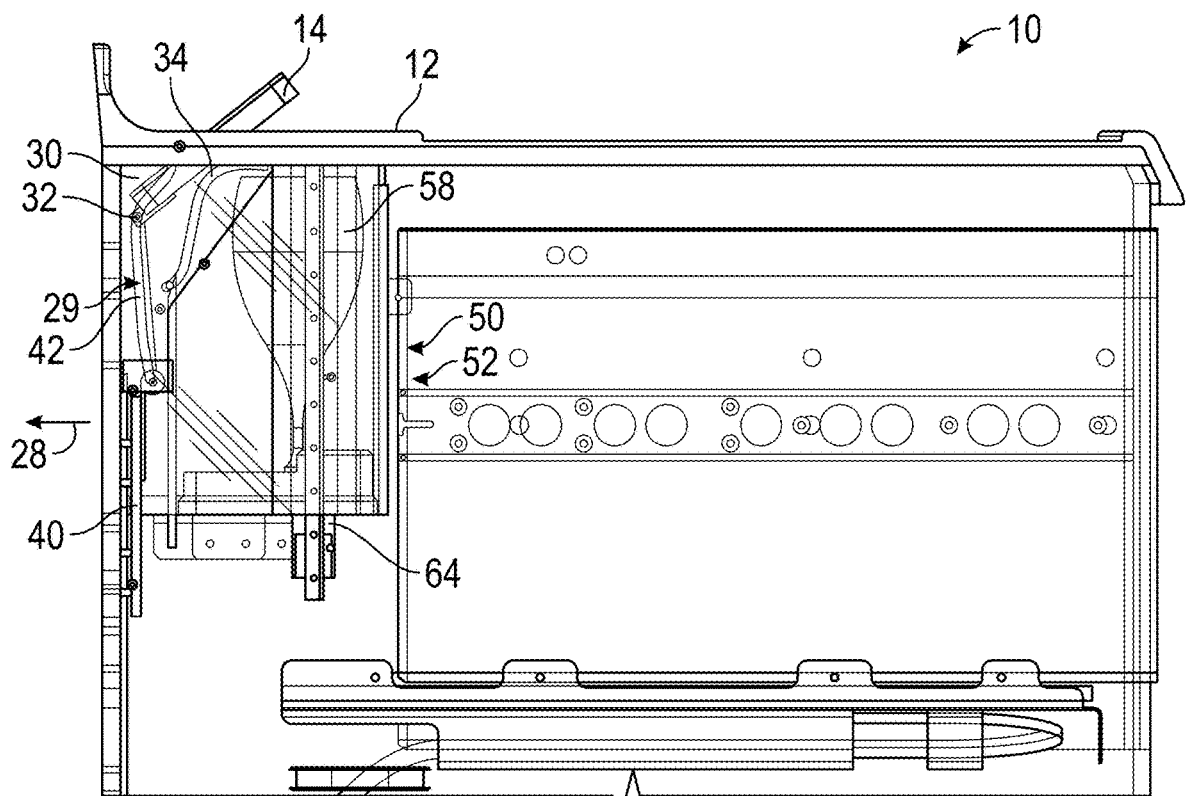
FIG. 9 illustrates a side view of a galley with a countertop area and a retractable storage assembly including a lid in a partially open, retracted position, and a base that supports a storage rack in a stowed position in accordance with an exemplary embodiment.
Figure 10:
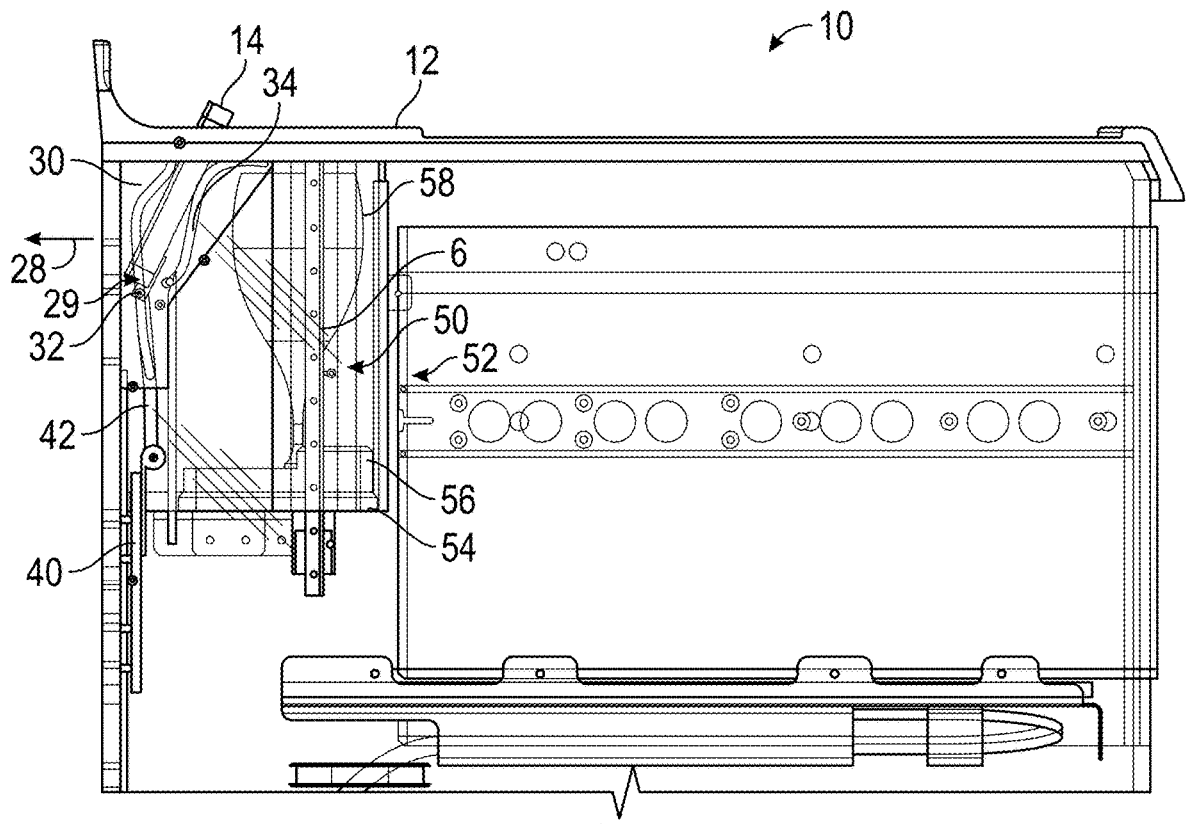
FIG. 10 illustrates a side view of a galley with a countertop area and a retractable storage assembly including a lid in a further advanced partially open, retracted position, and a base that supports a storage rack in a stowed position in accordance with an exemplary embodiment.
Figure 11:
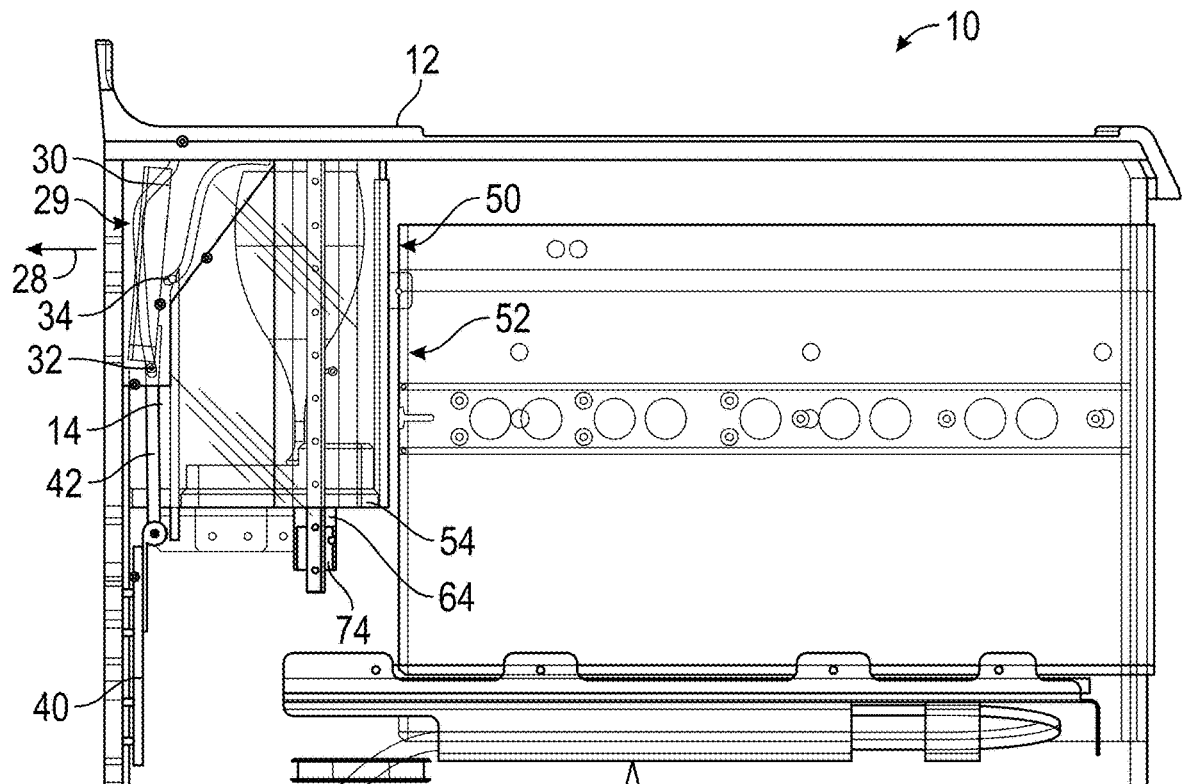
FIG. 11 illustrates a side view of a galley with a countertop area and a retractable storage assembly including a lid in a fully open, retracted position, and a base that supports a storage rack in a stowed position in accordance with an exemplary embodiment.

Referring the FIGS. 1 and 8, in an exemplary embodiment, a galley 10 with a countertop area 12 and a retractable storage assembly 14 is provided. As illustrated, the countertop area 12 has an outer surface 16 (e.g., upper outer surface) that is exposed and an inner surface 18 that is disposed opposite the outer surface 16. An opening 20 is formed through the countertop area 12 extending from the outer surface 16 to the inner surface 18.

Figure 4:
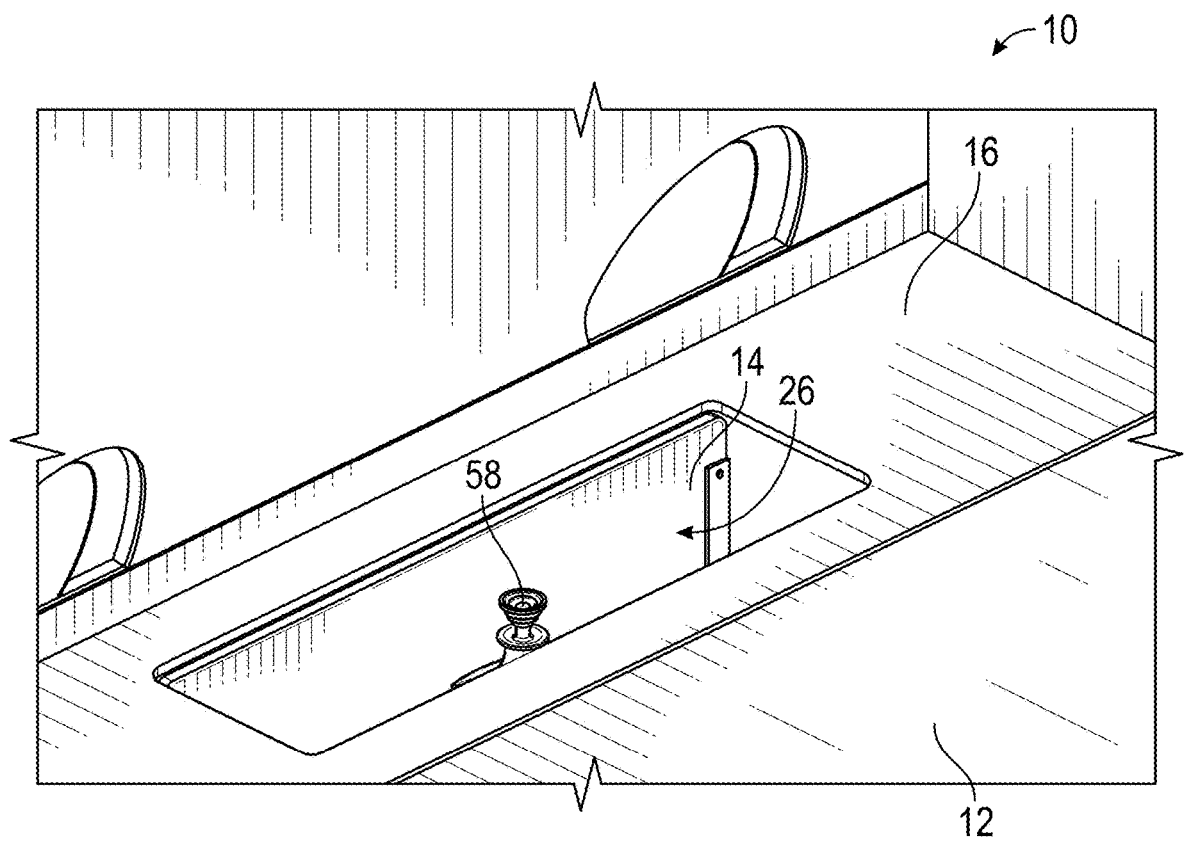
FIG. 4 illustrates a perspective view of a countertop area and a retractable storage assembly including a lid in a fully open, retracted position in accordance with an exemplary embodiment.
Figure 5:
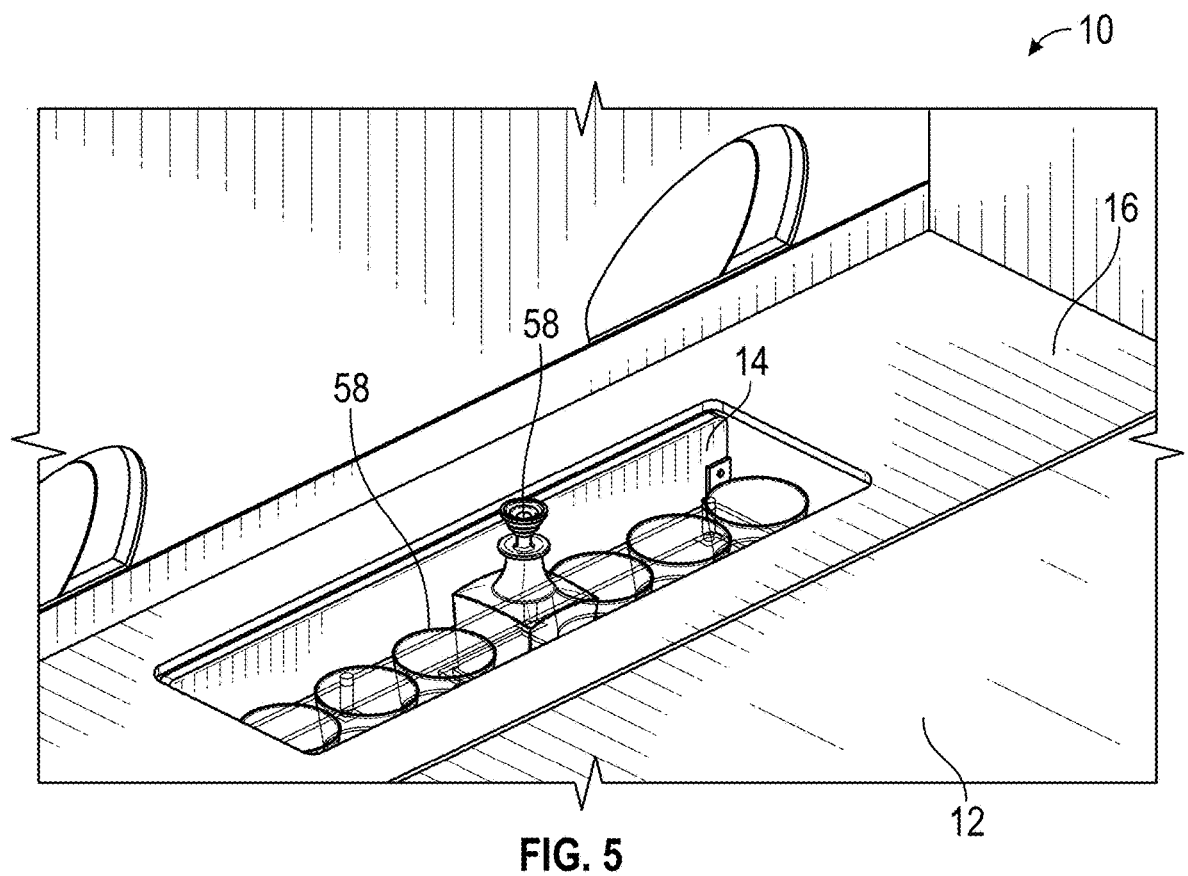
FIG. 5 illustrates a perspective view of a countertop area and a retractable storage assembly including a base that supports a storage rack in a partially deployed position in accordance with an exemplary embodiment.
Figure 6:
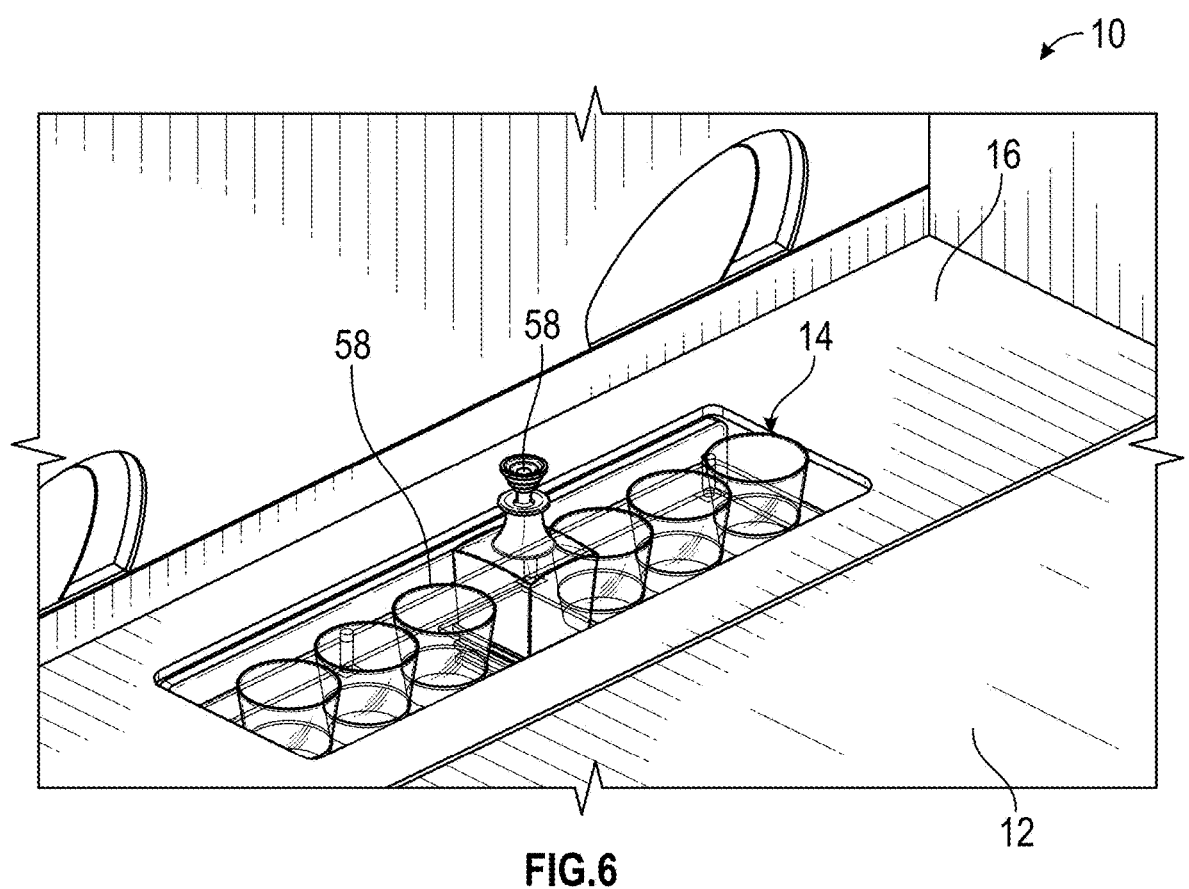
FIG. 6 illustrates a perspective view of a countertop area and a retractable storage assembly including a base that supports a storage rack in a further advanced deployed position in accordance with an exemplary embodiment.
Figure 7:
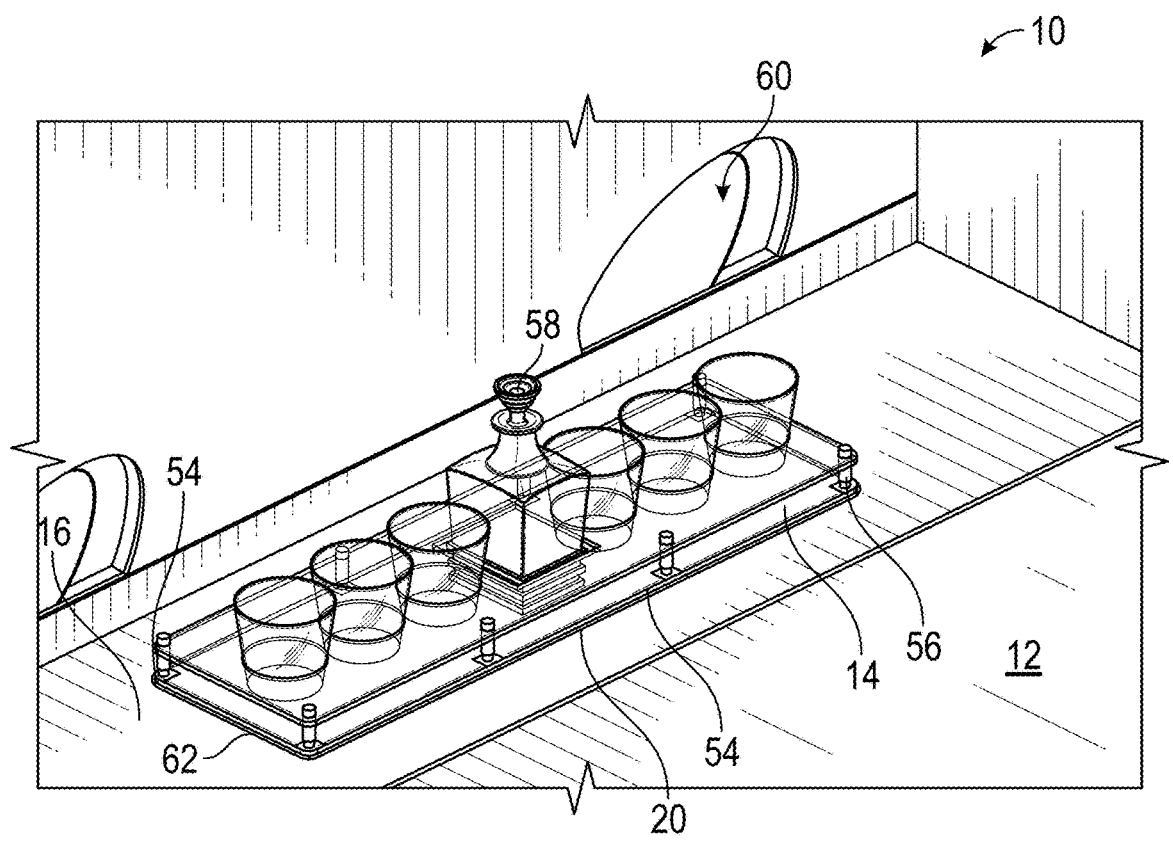
FIG. 7 illustrates a perspective view of a countertop area and a retractable storage assembly including a base that supports a storage rack in a fully deployed position in accordance with an exemplary embodiment.

The retractable storage assembly 14 includes a lid 22 that is disposed in the opening 20 when in a closed position 23. As illustrated, the lid 22 has an outer surface 24 that is substantially flush with the outer surface 16 of the surrounding portion of the countertop area 12. In an exemplary embodiment, the lid 22 is operatively coupled to the countertop area 12 via the retractable storage assembly 14 to move from the closed position 23 to an open, retracted position 26 as illustrated in FIG. 4. In particular and as illustrated in FIGS. 1-4 and 8-11, during movement, the lid 22 moves partially rotationally and translationally from a substantially horizontal orientation in the closed position 23 downward and in an outboard direction 28 (e.g., towards the back side of the galley 10) to a substantially vertical orientation underneath the countertop area 12 and is clear or "out of the way" of the opening 20 in the open, retracted position 26.

In an exemplary embodiment, the retractable storage assembly 14 includes a track-cam arrangement(s) 29 that slidingly couples the lid 22 to the galley 10. The track-cam arrangement 29 includes a track body portion(s) 30 and cam elements 32 and 34 (e.g., roller bearings or the like). The track body portion(s) 30 is coupled directly or indirectly to the inner surface 18 of the countertop 12 and/or another area (e.g., non-exposed area) of the galley 10, for example outboard of the opening 20, and includes tracks 36 and 38. The cam elements 32 and 34 are coupled to the lid 22 and are movably disposed in the tracks 36 and 38, respectively. The tracks 36 and 38 are configured such that when the lid 22 is actuated to move, the tracks 36 and 38 and the cam elements 32 and 34 cooperate to guide the lid 22 from a substantially horizontal orientation in the closed position 23 to a substantially vertical orientation underneath the countertop area 12 in the open, retracted position 26, and vice versa.

Figure 14:
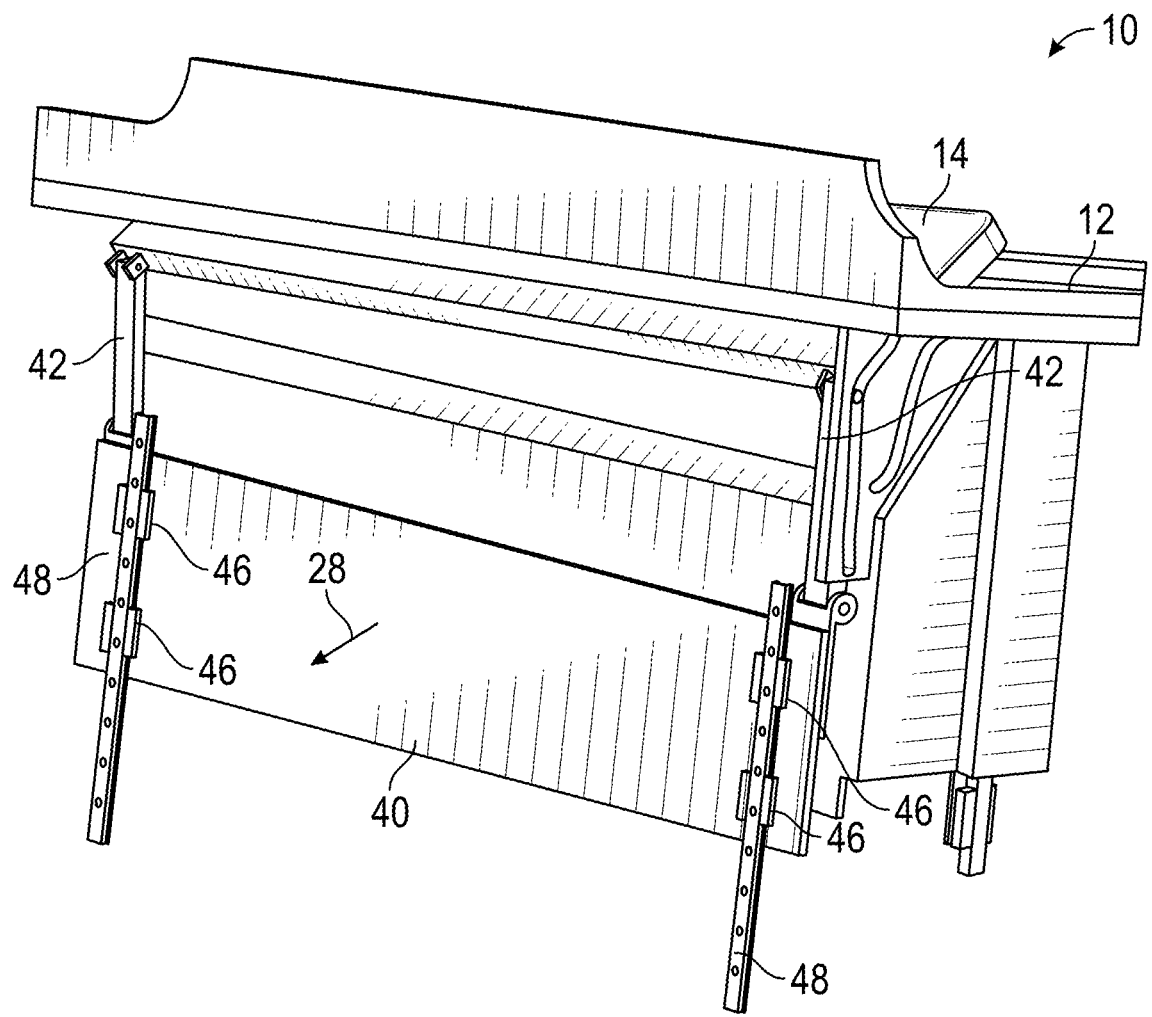
FIG. 14 illustrates a perspective view of a backside of a galley with a countertop area and a retractable storage assembly including a lid in a partially open, retracted position in accordance with an exemplary embodiment.
Figure 15:
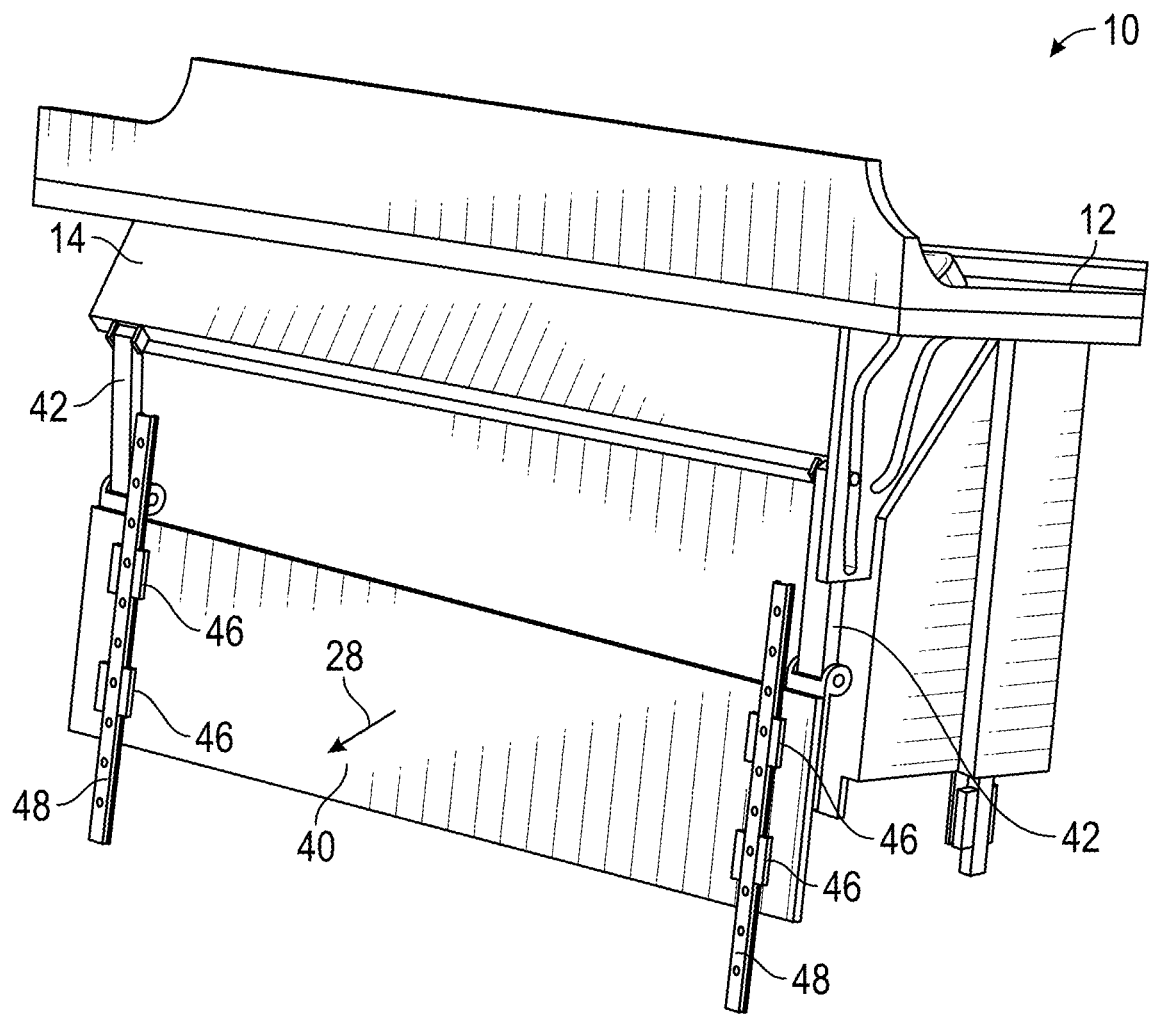
FIG. 15 illustrates a perspective view of a backside of a galley with a countertop area and a retractable storage assembly including a lid in a further advanced partially open, retracted position in accordance with an exemplary embodiment.
Figure 16:
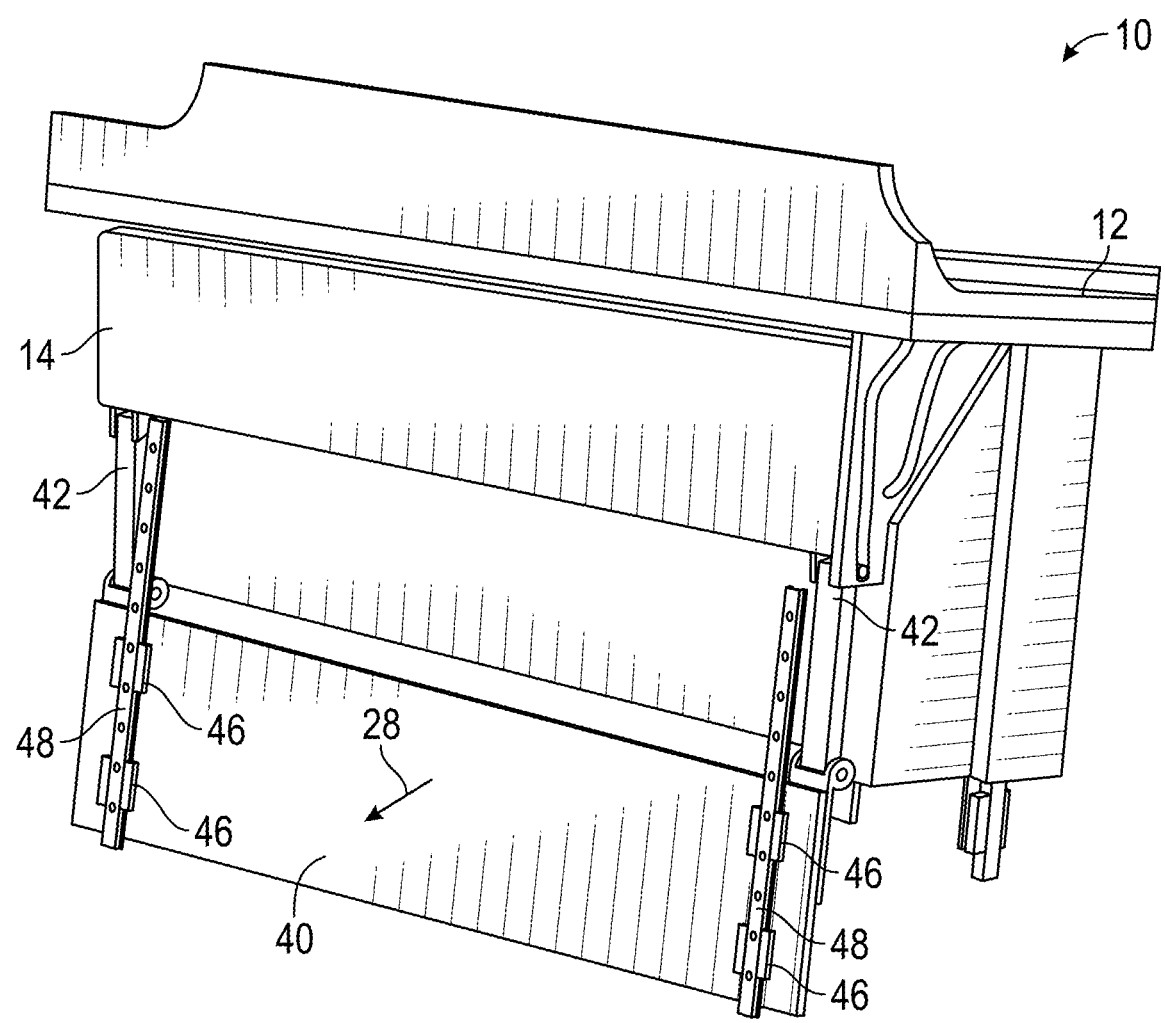
FIG. 16 illustrates a perspective view of a backside of a galley with a countertop area and a retractable storage assembly including a lid in a fully open, retracted position in accordance with an exemplary embodiment.

Referring also to FIGS. 14-16, the retractable storage assembly 14 further includes a movable panel 40 and a linkage(s) 42 that couples the movable panel 40 to a rear or outboard portion of the lid 22. As will be discussed in further detail below, the movable panel 40 is directly or indirectly coupled to an actuator, motor, or the like to drive the movable panel 40 to move.

In an exemplary embodiment, linear bearing carriages 46 are mounted on the movable panel 40 and slidingly engage linear bearing tracks 48 that extend substantially vertically under the countertop 12 outboard of the opening 20. When the movable panel 40 is driven to move, for example in a downward direction by an actuator, motor, or the like, the movable panel 40 pulls the linkage(s) 42, which pull the rear portion of the lid 22 downward to move the lid 22 from the closed position 23 to the open, retracted position 26 while the track-cam arrangement 29 guides the movement of the lid 22 as discussed above. Likewise, when the movable panel 40 is driven to move in an upward direction, the movable panel 40 pushes the linkage(s) 42, which push the rear portion of the lid 22 upward to move the lid 22 from the open, retracted position 26 to the closed position 23 while the track-cam arrangement 29 guides the movement of the lid 22.

Referring also to FIGS. 5-7 and 11-13, the retractable storage assembly 14 includes a storage area 50, which when in a retracted position 52 is situated below the countertop 12, for example directly below the opening 20 and out of view from outside of the galley 10. The storage area 50 includes a base 54 that supports a storage rack 56 for storing beverage items and/or accessories 58. When the lid 22 is in the open, retracted position 26, for example in a substantially vertical orientation underneath the countertop area 12 towards the back side of the galley 10 and "out of the way" of the opening 20, the storage area 50 moves from the retracted position 52 to a deployed position 60 where the outer surface 62 of the base 54 is substantially flush with the outer surface 16 of the countertop 12 and a remaining portion of the storage area 50 extends above the outer surface 16 of the countertop 12 accessible to passengers or other vehicle occupants.

In an exemplary embodiment, the retractable storage assembly 14 includes rails 64 that are coupled to the galley 10, for example below the countertop 12, and that extend vertically. The base 54 is slidingly coupled to the rails 64, for example via linear bearing carriages 74, a track-cam arrangement, or the like, to move vertically between the retracted position 52 and the deployed position 60. The base 54 may be directly or indirectly coupled to an actuator, motor, or the like to drive the base 54 to move up and/or down.

Figure 12:
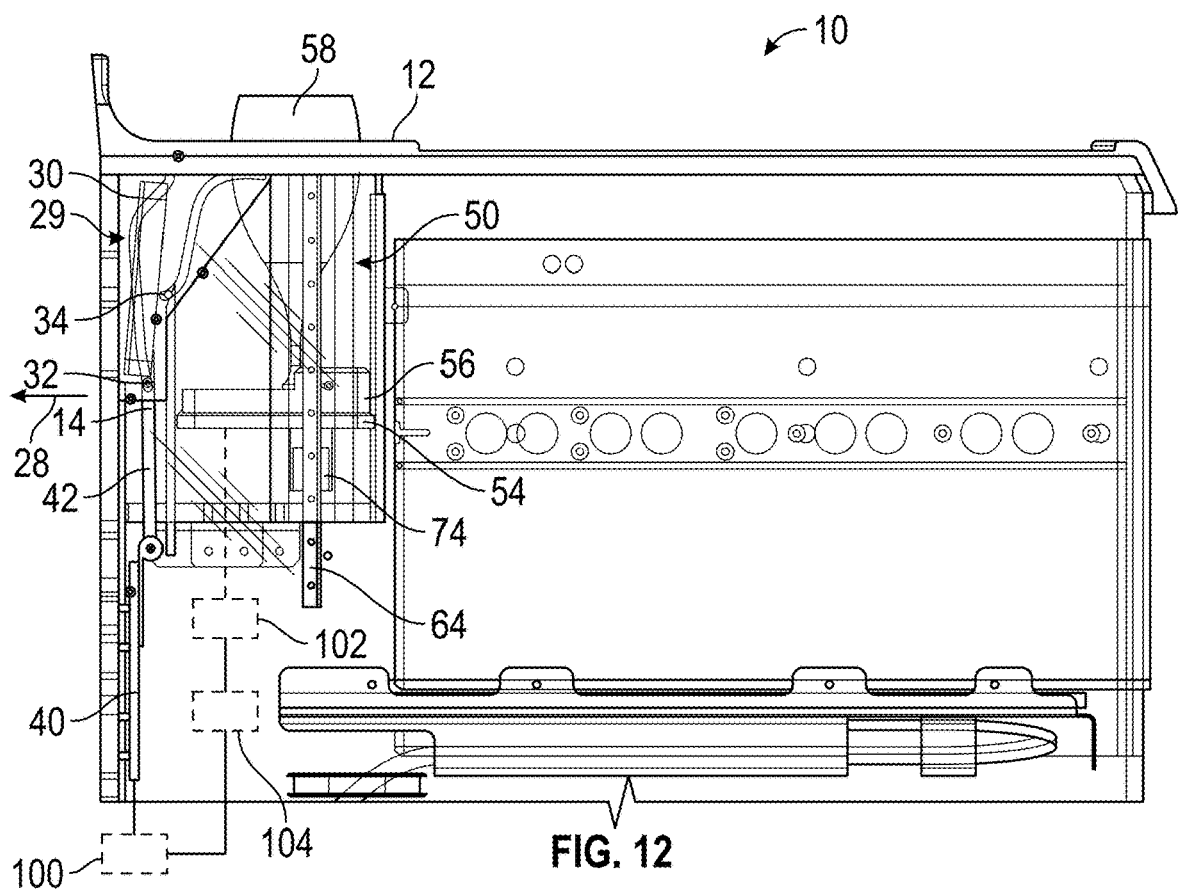
FIG. 12 illustrates a side view of a galley with a countertop area and a retractable storage assembly including a lid in a fully open, retracted position, and a base that supports a storage rack in a partially deployed position in accordance with an exemplary embodiment.
Figure 13:
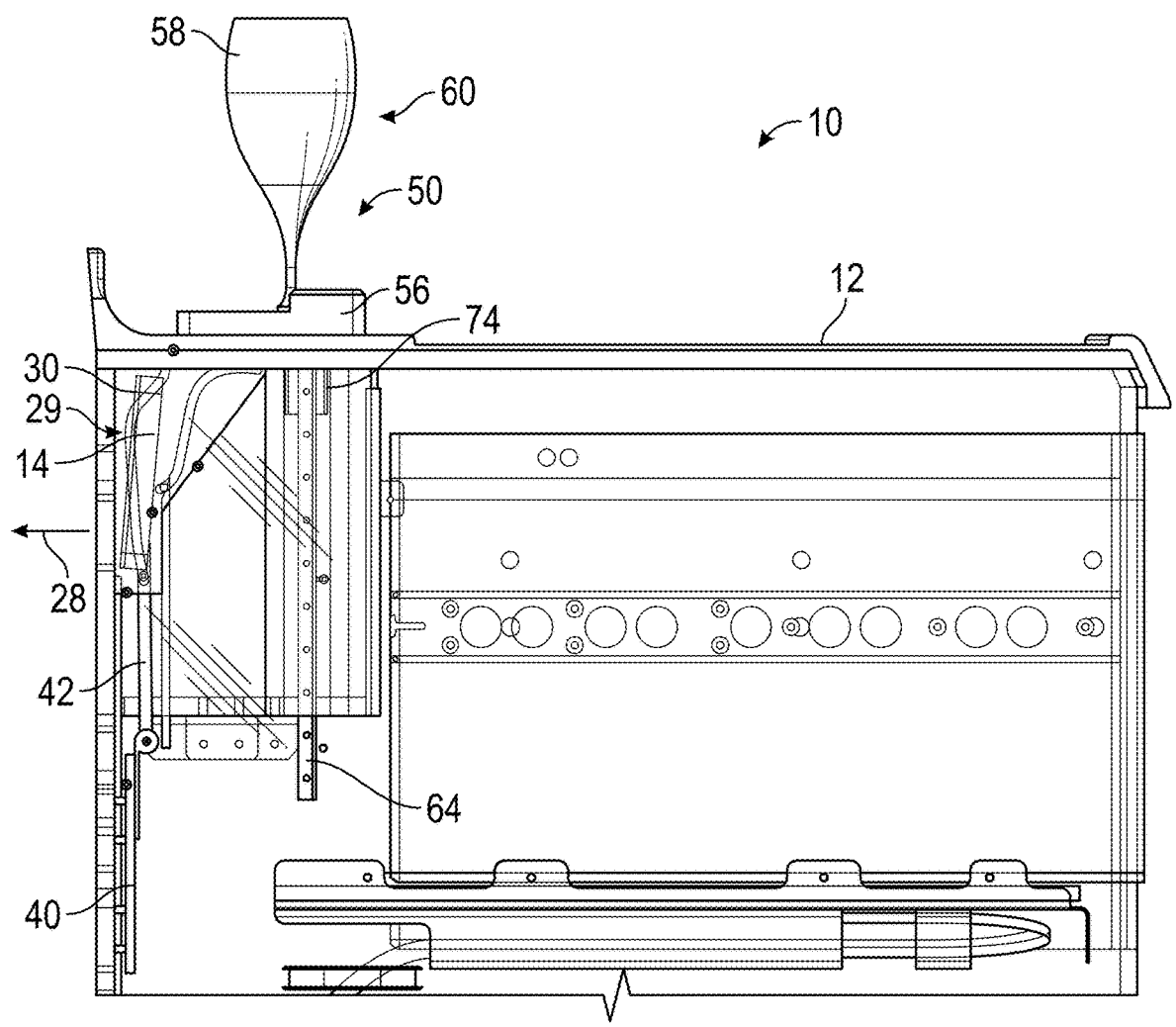
FIG. 13 illustrates a side view of a galley with a countertop area and a retractable storage assembly including a lid in a fully open, retracted position, and a base that supports a storage rack in a fully deployed position in accordance with an exemplary embodiment.

Referring to FIG. 12, in an exemplary embodiment, the retractable storage assembly 14 includes a first motor (e.g., first linear actuator) 100 and a second motor (e.g., second linear actuator) 102. The movable panel 40 is moved by the first motor 100 and the base 54 is moved by the second motor 102 in which the first motor 100 and the second motor 102 are in communication with each other via microswitches 104 to coordinate the movement of the lid 22 and the base 54 as discussed above.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A countertop storage assembly comprising:
    a countertop having a countertop area outer surface that is exposed, a countertop area inner surface that is disposed opposite the countertop area outer surface, and an opening formed therethrough; and
    a retractable storage assembly comprising:
        a lid that is disposed in the opening when in a closed position and that is operatively coupled to the countertop to move between the closed position and an open, retracted position, wherein during movement from the closed position to the open, retracted position, the lid moves downward and away from the opening to below the countertop off-set from the opening; and
        a storage area including a base that is in a retracted position situated below the countertop and the lid when the lid is in the closed position, and wherein the base is configured to move from the retracted position to a deployed position where the base is disposed in the opening when the lid is in the open, retracted position,
        wherein the base is directly below the opening when in the retracted position, and
        wherein the base moves vertically between the retracted position and the deployed position.

2. The countertop storage assembly of claim 1, wherein the lid moves partially rotationally and translationally from the closed position downward and in an outboard direction away from the opening to the open, retracted position.

3. The countertop storage assembly of claim 1, wherein the lid is in a substantially horizontal orientation when in the closed position.

4. The countertop storage assembly of claim 1, wherein the lid has a lid outer surface that is substantially flush with the countertop area outer surface when in the closed position.

5. The countertop storage assembly of claim 1, wherein the lid is in a substantially vertical orientation when in the open, retracted position.

6. The countertop storage assembly of claim 1, wherein the base has a base outer surface that is substantially flush with the countertop area outer surface when in the deployed position.

7. The countertop storage assembly of claim 1, wherein the retractable storage assembly further comprises a track-cam arrangement that slidingly couples the lid to the countertop adjacent to the countertop area inner surface, wherein the track-cam arrangement is configured to guide the lid between the closed position and the open-retracted position when the lid is actuated to move.

8. The countertop storage assembly of claim 1, wherein the retractable storage assembly further comprises a movable panel that is movably disposed under countertop and a linkage that couples the movable panel to a portion of the lid, wherein when the movable panel is driven to move in a downward direction, the movable panel pulls the linkage thereby moving the lid from the closed position to the open, retracted position, and wherein when the movable panel is driven to move in an upward direction, the movable panel pushes the linkage thereby moving the lid from the open, retracted position to the closed position.

9. The countertop storage assembly of claim 8, wherein the retractable storage assembly further comprises a motor that is operatively coupled to the movable panel to drive the movable panel in the downward direction and, independently, in the upward direction.

10. The countertop storage assembly of claim 1, wherein the retractable storage assembly further comprises rails that extend vertically below the countertop, and wherein the base is slidingly coupled to the rails to move between the retracted position and the deployed position.

11. The countertop storage assembly of claim 10, further comprising linear bearing carriages that slidingly couple the base to the rails.

12. The countertop storage assembly of claim 10, wherein the retractable storage assembly further comprises a motor that is operatively coupled to the base to drive the base between the retracted position and the deployed position.

13. The countertop storage assembly of claim 1, wherein the countertop storage assembly forms part of a galley.

14. The countertop storage assembly of claim 1, wherein the retractable storage assembly is configured as a retractable bar.

15. The countertop storage assembly of claim 1, wherein the storage area further includes a storage rack that is supported by the base and that is configured to store one of beverages, beverage items, accessories, and a combination thereof.

16. A countertop storage assembly comprising:
- a countertop having a countertop area outer surface that is exposed, a countertop area inner surface that is disposed opposite the countertop area outer surface, and an opening formed therethrough; and
- a retractable storage assembly comprising:
  - a lid that is disposed in the opening when in a closed position and that is operatively coupled to the countertop to move between the closed position and an open, retracted position, wherein during movement from the closed position to the open, retracted position, the lid moves partially rotationally and translationally from a substantially horizontal orientation in the closed position downward and in an outboard direction to a substantially vertical orientation underneath the countertop area inner surface off-set from the opening in the open, retracted position; and
  - a storage area including a base that is in a retracted position situated directly below the opening when the lid is in the closed position, and wherein the base is configured to move vertically from the retracted position to a deployed position where the base is disposed in the opening when the lid is in the open, retracted position.

17. The countertop storage assembly of claim 16, wherein the retractable storage assembly further comprises:
- a movable panel that is movably disposed under countertop and a linkage that couples the movable panel to a portion of the lid; and
- a first motor that is operatively coupled to the movable panel to drive the movable panel in a downward direction thereby pulling the linkage and moving the lid from the closed position to the open, retracted position and, independently, to drive the movable panel in an upward direction thereby pushing the linkage and moving the lid from the open, retracted position to the closed position.

18. The countertop storage assembly of claim 16, wherein the retractable storage assembly further comprises:
- a second motor that is operatively coupled to the base to drive the base between the retracted position and the deployed position; and
- at least one micro-switch in communication with the first and second motors to coordinate movement of the lid and the base.

\* \* \* \* \*